United States Patent [19]

Saito et al.

[11] Patent Number: 4,975,832
[45] Date of Patent: Dec. 4, 1990

[54] MICROCOMPUTER SYSTEM WITH DUAL DMA MODE TRANSMISSIONS

[75] Inventors: Shuichi Saito, Tachikawa; Mituru Hasegawa, Komae, both of Japan

[73] Assignee: Teac Corporation, Tokyo, Japan

[21] Appl. No.: 480,321

[22] Filed: Feb. 8, 1990

Related U.S. Application Data

[63] Continuation of Ser. No. 210,720, Jun. 23, 1988, abandoned.

[30] Foreign Application Priority Data

Jun. 25, 1987 [JP]  Japan ................................ 62-158004

[51] Int. Cl.[5] ...................... G06F 13/32; G06F 13/14; G06F 13/00
[52] U.S. Cl. .................... 364/200; 364/900; 364/242.3; 364/242.31; 364/242.32; 364/950.2
[58] Field of Search ... 364/200 MS File, 900 MS File

[56] References Cited

U.S. PATENT DOCUMENTS

| | | | |
|---|---|---|---|
| 4,181,938 | 1/1980 | Suzuki et al. | 364/200 |
| 4,371,926 | 2/1983 | Yamaura et al. | 364/200 |
| 4,417,304 | 11/1983 | Dinwiddie, Jr. | 364/200 |
| 4,479,179 | 10/1984 | Dinwiddie, Jr. | 364/200 |
| 4,528,626 | 7/1985 | Dean et al. | 364/200 |
| 4,530,053 | 7/1985 | Kriz et al. | 364/200 |
| 4,716,523 | 12/1987 | Burrus, Jr. et al. | 364/200 |
| 4,782,439 | 11/1988 | Borkar et al. | 364/200 |
| 4,811,306 | 3/1989 | Boning et al. | 364/200 |
| 4,831,523 | 5/1989 | Lewis et al. | 364/200 |
| 4,847,750 | 7/1989 | Daniel | 364/200 |
| 4,866,597 | 9/1989 | Kinoshita | 364/200 |
| 4,878,166 | 12/1989 | Johnson et al. | 364/200 |

*Primary Examiner*—Michael R. Fleming
*Assistant Examiner*—Gopal C. Ray
*Attorney, Agent, or Firm*—Woodcock Washburn Kurtz Mackiewicz & Norris

[57] ABSTRACT

A microcomputer interfaced with an input/output (I/O) device comprises a central processor unit (CPU), a memory, and a direct memory access (DMA) controller, together with a bus system for interconnecting them. The DMA controller can cause the CPU either to be electrically coupled to the bus system for programmed CPU data transmission between the I/O device and the memory, or to be uncoupled therefrom for DMA data transmission therebetween. The CPU is periodically coupled to, and uncoupled from, the bus system for data transmission in a cycle steal mode, in which DMA transmission and programmed CPU transmission alternate at regular intervals, when the CPU is active. When the CPU is inactive, on the other hand, the CPU is held uncoupled from the bus system for data transmission in a sustained DMA mode. More efficient data transmission is thus possible than if data is transmitted in the cycle steal mode regardless of whether the CPU is active or inactive.

2 Claims, 3 Drawing Sheets

MICROCOMPUTER SYSTEM WITH DUAL DMA MODE TRANSMISSIONS

This is a continuation of application Ser. No. 210,720, filed June 23, 1988, now abandoned.

BACKGROUND OF THE INVENTION

Our invention relates to a method of, and apparatus for, data transmission between the internal memory of a microcomputer and an input/output device interfaced therewith.

As is well known, the direct memory access (DMA) method is usually employed for data transmission between the random access memory of a microcomputer memory and an external file memory constituting a part of the input/output device interfaced with the microcomputer. The DMA makes possible direct, and therefore more efficient, data transmission between microcomputer memory and file memory, as distinguished from programmed data transmission under the control of a central processor unit (CPU) built into the microcomputer. DMA data transmission resolves itself into the following three modes, all familiar to the specialists:

1. Cycle Steal Mode

DMA transmission and programmed CPU transmission alternate at regular intervals of one to several memory cycles. This mode offers the advantage of good system response during both DMA and CPU transmissions. In this mode, however, the same bus system is used for both DMA and CPU transmissions, with the CPU electrically coupled to and uncoupled from the bus system at regular intervals. If a substantial difference exists between the processing time required for CPU transmission and that required for DMA transmission, either of the two transmission modes that must transmit a greater amount of data (e.g. DMA transmission) demands a longer time for the complete transfer of the required amount of data. The need for the frequent coupling and uncoupling of the CPU to and from the bus system is another weakness of the Cycle Steal mode.

2. Burst Mode

When DMA transmission is required, the CPU is held inactive until the DMA transmission of a prescribed amount of data is completed. Each period of DMA transmission in the Burst mode is much longer than that in the Cycle Steal mode. The efficiency of DMA data transmission is gained, however, at the sacrifice of the response of the CPU, the latter being held isolated from the bus system during the extended period of DMA transmission. The Burst mode is therefore unsuited for applications where immediate response is essential.

3. Dual Bus Mode

Separate buses are used for DMA transmission and CPU transmission. Although response is good in both modes of operation, the separate buses inevitably make the hardware complex and expensive. The system configuration becomes even more complex in cases where the CPU requires data for DMA transmission, because then bus switches are needed for connection and disconnection of the two buses.

Thus, all the conventional methods of DMA data transmission have their own strengths and weaknesses. None of them is truly satisfactory by itself.

SUMMARY OF THE INVENTION

We have hereby invented how to efficiently transmit data between the internal memory of a microcomputer and an input/output device interfaced therewith, without sacrificing the response of the CPU.

Briefly stated in one aspect thereof, our invention concerns a method of dual mode data transmission for a microcomputer which is configured for data transmission in the cycle steal mode, in which DMA transmission and programmed CPU transmission alternate periodically, between its internal memory and an input/output device interfaced therewith. The dual mode method of our invention dicates data transmission in the cycle steal mode if the CPU of the microcomputer is active, and as long as the CPU remains so, when DMA data transmission is required. On the other hand, if the CPU is inactive when DMA data transmission is requested, data is transmitted in a sustained DMA mode as long as the CPU remains so.

According to the above summarized method of our invention, data is transmitted either in the cycle steal mode or in the sustained DMA mode depending upon whether the CPU is active or inactive. The sustained DMA mode affords transmission of a greater amount of data per unit time than does the cycle steal mode. The CPU is held isolated from the bus system during the sustained DMA mode data transmission. However, since the sustained DMA mode is set up only when the CPU is inactive, its response does not become lower than if data is transmitted only in the cycle steal mode in accordance with the prior art. It will also be understood that our invention overcomes the noted drawbacks of the conventional burst mode and dual bus mode.

Another aspect of our invention pertains to a microcomputer for carrying the above dual mode data transmission method into practice. The microcomputer comprises a memory connected to a bus system for data transmission to or from an input/output device interfaced with the microcomputer. A CPU is provided which can be electrically coupled to the bus system to control data transmission between the memory and the input/output device in a programmed CPU mode, and uncoupled from the bus system to permit data transmission therebetween in a DMA mode. Data transmission is therefore possible in the cycle steal mode by periodically coupling and uncoupling the CPU to and from the bus system.

Also included is a DMA controller connected to the bus system and the CPU for controlling data transmission between the input/output device and the memory. The DMA controller comprises a first input for receiving a data transmission request signal indicative of whether or not data transmission in the DMA mode is required, a second input for receiving from the CPU a halt signal indicative of whether the CPU is active or inactive, and a modified hold request signal generator circuit connected to both the first and second inputs for generating and delivering a modified hold request signal to the CPU in order to cause the same to be controllably coupled to and uncoupled from the bus system. The modified hold request signal is responsive to both the data transmission request signal and the halt signal for causing the CPU to be periodically coupled to and uncoupled from the bus system for data transmission in the cycle steal mode if the CPU is active, and as long as the CPU remains so, when DMA data transmission is requested by the data transmission request signal, and for causing the CPU to remain uncoupled from the bus system for data transmission in the sustained DMA mode if the CPU is inactive, and as long as the CPU remains so, when DMA data transmission is requested by the data transmission request signal.

The CPU of the microcomputer in accordance with our invention is commercially available, so that all that is required for the practice of the invention is the DMA controller comprising the circuit for generating the modified hold request signal. We have so named the modified hold request signal because the hold request signal has been known which has been used to cause the CPU to be periodically coupled to and uncoupled from the bus system for data transmission in the cycle steal mode. This hold request signal is hereby modified to hold the CPU uncoupled from the bus system for data transmission in the sustained DMA mode when the CPU is inactive. This simple modification adapts the microcomputer for the improved dual mode data transmission of our invention.

The above and other features and advantages of our invention and the manner of realizing them will become more apparent, and the invention itself will best be understood, from a study of the following description and appended claims, with reference had to the attached drawings showing a preferred embodiment of the invention.

DESCRIPTION OF THE PREFERRED EMBODIMENT

Figure 1:
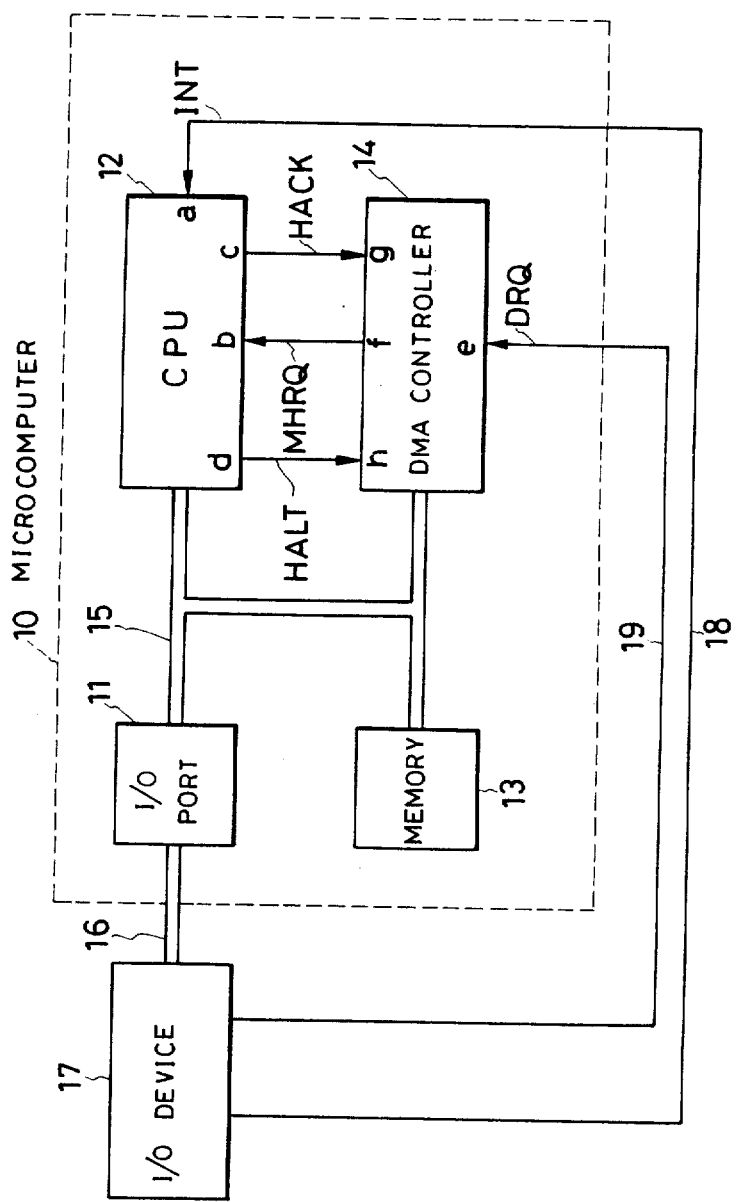
FIG. 1 is a block diagram of the microcomputer, shown together with the input/output device interfaced therewith, embodying the principles of our invention.

We will now describe our invention in detail in the environment of a one chip microcomputer 10 shown in FIG. 1. The microcomputer 10 comprises: (a) an input-/outport (I/O) port 11 serving as an input and/or output interface; (b) a central processor unit (CPU) 12 having a register section, an arithmetic section and a control section; (c) a memory 13 having a random access memory (RAM) section and a read only memory (ROM) section; (d) a DMA controller circuit 14; and (e) a bus system 15 interconnecting the noted microcomputer components 11–14 for the transmission of data, address and control signals.

The I/O port 11 is further coupled via an I/O bus 16 to an I/O device 17 which is external to the microcomputer 10 and which typically comprises a magnetic tape file memory, a display device and a keyboard. We understand that the I/O device 17 is further equipped to generate an INTERRUPT REQUEST signal INT, for delivery to the CPU 12 by way of a line 18, and a DATA TRANSMISSION REQUEST signal DRQ for delivery to the DMA controller circuit 14 by way of a line 19. The natures of these signals will become apparent as the description proceeds.

The CPU 12 carries out desired arithmetic and logic operations in accordance with the program that has been introduced into the ROM section of the memory 13. Its construction can be substantially the same as that of the CPU "Z80" (trademark) manufactured by Zilog, Inc. The CPU 12 has two inputs a and b and two outputs c and d. The input a is for receiving the INTERRUPT REQUEST signal from the I/O device 17 over the line 18. The other input b is for receiving a MODIFIED HOLD REQUEST signal MHRQ (heretofore known as a hold request or bus request signal). The MODIFIED HOLD REQUEST signal demands the electrical uncoupling or isolation of the CPU 12 from the bus system 15 for data transmission either in the Cycle Steal mode or in the sustained DMA mode depending upon whether the CPU 12 is active or inactive, in accordance with a feature of our invention.

The output c of the CPU 12 is for the delivery of a HOLD ACKNOWLEDGE signal HACK (known also as a bus acknowledge signal) indicative of whether or not the CPU has become isolated, as far as signal transmission is concerned, from the bus system 15 in response to the MODIFIED HOLD REQUEST signal. With the CPU 12 so isolated from the bus system 15, the bus system becomes usable for data transmission in the DMA mode, rather than under the CPU control, between memory 13 and I/O device 17. The other output d of the CPU 12 is for the delivery of a HALT or standby signal indicative of whether the CPU is active or inactive.

We understand that, as is quite conventional in the art, the CPU 12 as well as the DMA controller circuit 14 incorporates a tristate buffer capable of assuming any of the three states of high level output, low level output, and high impedance. The CPU 12 becomes isolated from the bus system 15 when the buffer is placed in the state of high impedance.

The DMA controller circuit 14 functions to selectively set the microcomputer 10 in the DMA mode such that the data is sent directly between the RAM section of the memory 13 and the I/O device 17, bypassing the CPU 12. Its input e is for the reception of the noted DATA TRANSMISSION REQUEST signal from the I/O device 17 over the line 19. As the name implies, the DATA TRANSMISSION REQUEST signal requests transmission of data in the DMA mode between memory 13 and I/O device 17. In response to this DATA TRANSMISSION REQUEST signal the DMA controller circuit 14 delivers the aforesaid MODIFIED HOLD REQUEST signal from its output f to the input b of the CPU 12. The two inputs g and h of the DMA controller circuit 14 are for receiving the HOLD ACKNOWLEDGE signal and the HALT signal, respectively, from the CPU 12.

Figure 2:
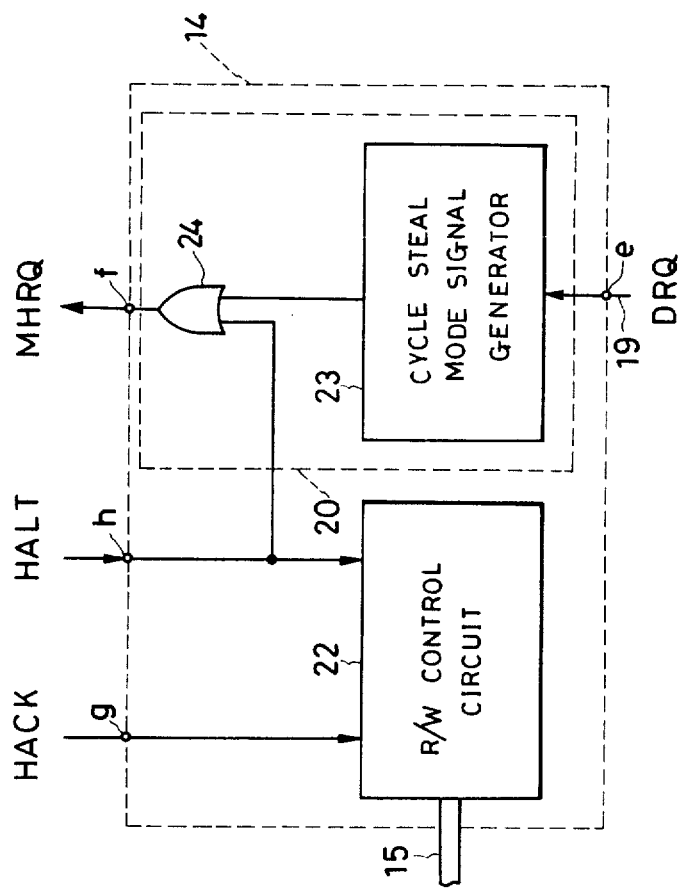
FIG. 2 is a block diagram of the DMA controller circuit included in the microcomputer of FIG. 1.

Reference is directed to FIG. 2 for further details of the DMA controller circuit 14. Broadly, it comprises a circuit 20 for generating the MODIFIED HOLD REQUEST signal MHRQ, and a circuit 22 for controlling the reading and writing of data on the memory 13. The MODIFIED HOLD REQUEST signal generator circuit 20 includes a circuit 23 coupled to the DATA TRANSMISSION REQUEST signal input e for generating a cycle steal mode signal which forms part of the MODIFIED HOLD REQUEST signal, and an OR gate 24 having an input connected to the circuit 23. Another input of the OR gate 24 is connected to the HALT signal input h, and its output is connected to the MODIFIED HOLD REQUEST signal output f.

The signal generator circuit 23 generates the cycle steal mode signal in the form of a series of constant duration pulses when the incoming DATA TRANSMISSION REQUEST signal is high, demanding DMA data transmission. The OR gate 24 permits the output pulses of the cycle steal mode signal generator circuit 23 to pass therethrough when the HALT signal is low, namely, when the CPU 12 is active. Consequently, the MODIFIED HOLD REQUEST signal takes the form of a series of constant duration pulses when the CPU 12 is active. When the CPU 12 is inactive, on the other hand, as manifested by the high state of the HALT signal, the MODIFIED HOLD REQUEST signal produced by the OR gate 24 maintains a high state despite the continued application thereto of the output pulses of the cycle steal mode signal generator circuit 23.

The read/write control circuit 22 is connected to the CPU 12 for receiving the HOLD ACKNOWLEDGE signal and the HALT signal therefrom, besides being connected to the bus system 15. When the HALT signal indicates the uncoupling of the CPU 12 from the bus system 15, the read/write control circuit 22 controls data transmission in the DMA mode.

Of course, both CPU 12 and DMA controller circuit 14 have numerous other terminals than those shown in FIGS. 1 and 2. We have not illustrated such additional terminals because they are conventional in the art and bear no direct pertinence to our invention.

OPERATION

Figure 3:
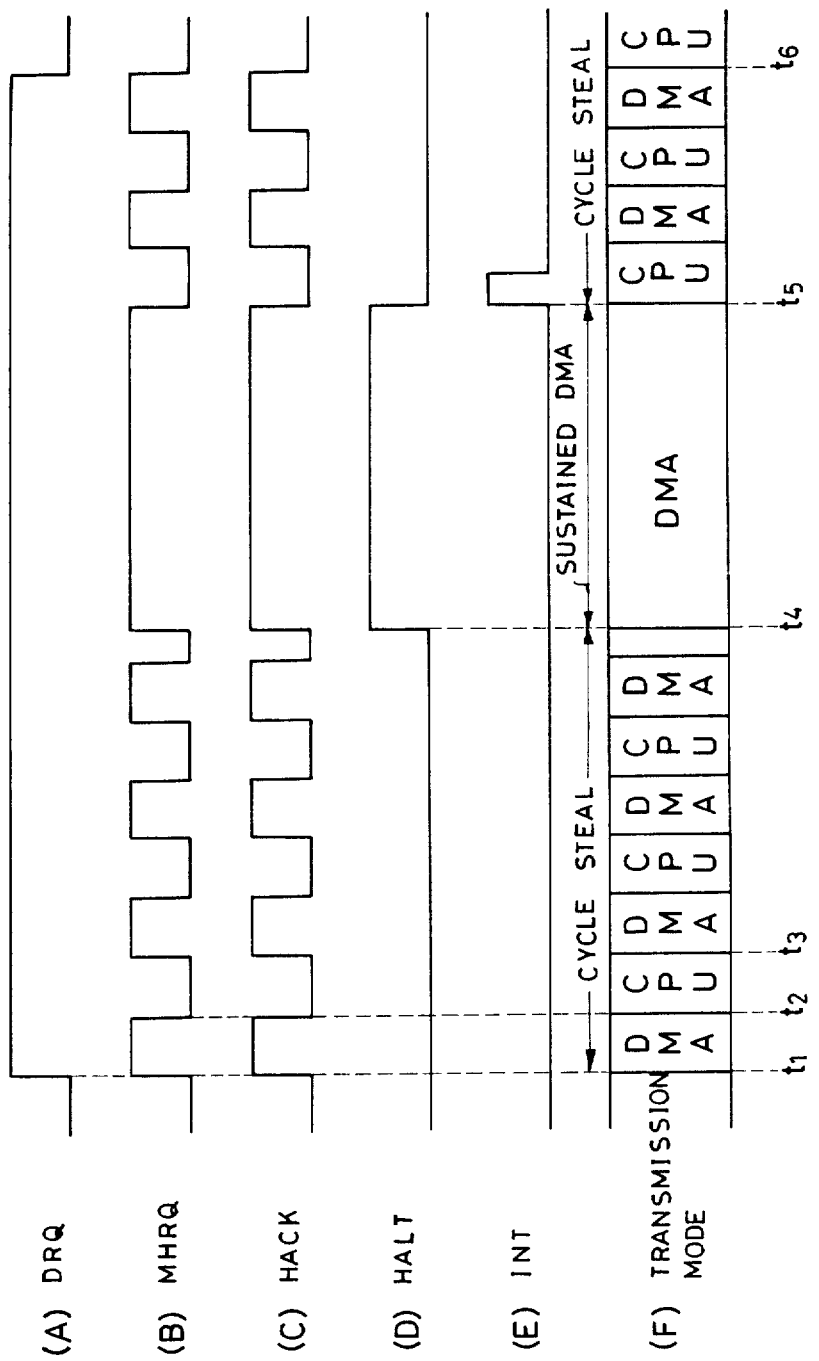
FIG. 3 is a diagram of waveforms appearing in the various parts of the microcomputer system of FIG. 1, the waveforms being shown together with corresponding modes of data transmission.

The operation of the microcomputer system of FIG. 1 will be better understood by referring to FIG. 3 which shows the signals (A) through (E) appearing in the various parts of the FIG. 1 system, as well as the modes of data transmission (F), in proper time relation to one another.

Let us suppose that the DATA TRANSMISSION REQUEST signal DRQ, supplied from the I/O device 17 to the DMA controller circuit 14, has gone high at a moment t1, as indicated at (A) in FIG. 3. The DATA TRANSMISSION REQUEST signal when in the high (binary ONE) state demands data transmission in the DMA mode, although actually data is transmitted in either the Cycle Steal mode or the Sustained DMA mode depending upon whether the CPU 12 is active or inactive. Let us also assume that the HALT signal delivered from CPU 12 to DMA controller circuit 14 is then low (binary ZERO), as at (D) in FIG. 3, indicating that the CPU is active. The DMA controller circuit 14 will then respond to the DATA TRANSMISSION REQUEST and HALT signals of the noted states by starting control action necessary for data transmission in the Cycle Steal mode. The control action is such that, first of all, the MODIFIED HOLD REQUEST signal fed from DMA controller circuit 14 to CPU 12 will go high at the moment t1, as at (B) in FIG. 3, demanding the CPU to isolate itself from the bus system 15. The CPU 12 will check the MODIFIED HOLD REQUEST signal upon lapse of one machine cycle following the moment t1. If then the MODIFIED HOLD REQUEST signal is high, as is the case here, the CPU 12 will isolate itself from the bus system 15 and will proceed to make the HOLD ACKNOWLEDGE signal go high, as at (C) in FIG. 3, thereby notifying the DMA controller circuit 14 of the uncoupling of the CPU from the bus system. We have disregarded the lapse of one machine cycle in showing the transition of the HOLD ACKNOWLEDGE signal from the low to the high state in FIG. 3(C) for the convenience of illustration.

When the HOLD ACKNOWLEDGE signal goes high at the moment t1, with the machine cycle being disregarded, the DMA controller circuit 14 will respond by initiating DMA data transmission, as the initial phase the Cycle Steal mode, between memory 13 and I/O device 17, as indicated at (F) in FIG. 3. Then, upon lapse of one to several memory cycles, the MODIFIED HOLD REQUEST signal will go low at a moment t2, with the result that the CPU 12 becomes recoupled to the bus system 15. The CPU 12 will then control the programmed transfer of data to or from the memory 13 as the second phase of the Cycle Steal mode, as indicated by the capitals CPU at (F) in FIG. 3.

Then, as the same memory cycle or cycles elapse during the time interval t2-3, the MODIFIED HOLD REQUEST signal will again go high, as at (B) in FIG. 3. DMA data transmission will then be restarted as the CPU 12 becomes isolated again from the bus system 15. Thus, as will be understood from FIG. 3(F), data will be transmitted in the Cycle Steal mode from moment t1 to moment t4, with the DMA transmission and programmed CPU transmission alternating periodically.

The HALT signal put out by the CPU 12 is shown to go high at the moment t4 in FIG. 3(D) during the progress of the Cycle Steal mode data transmission, thereby indicating that the CPU has become inactive. The DMA controller circuit 14 will respond to this HALT signal to commence data transmission in the sustained DMA mode in accordance with the teachings of our invention. Since the HALT signal of the high state is directed to the OR gate 24, FIG. 2, of the MODIFIED HOLD REQUEST signal generator circuit 20, the MODIFIED HOLD REQUEST signal will remain high as long as the HALT signal remains so.

Delivered to the CPU 12, the MODIFIED HOLD REQUEST signal will hold the same uncoupled from the bus system 15 as long as the HALT signal remains high, that is, as long as the CPU remains inactive. Data will now be transmitted between memory 13 and I/O device 17 in the Sustained DMA mode, instead of in the Cycle Steal mode as from moment t1 to moment t4. The Sustained DMA mode permits the transmission of a greater amount of data per unit time than does the Cycle Steal mode.

At (E) in FIG. 3 is shown the INTERRUPT REQUEST signal to go high at a moment t5 following the moment t4. Fed from I/O device 17 to CPU 12 as shown in FIG. 1, the INTERRUPT REQUEST signal demands the CPU to become active again, so that the Sustained DMA mode data transmission must be taken over by the Cycle Steal mode transmission. As the CPU 12 becomes active in response to the INTERRUPT REQUEST signal, the HALT signal put out by the CPU will go low at the moment t5, as at (D) in FIG. 3. Thereupon, as will be understood by referring to FIG. 2 again, the OR gate 24 of the MODIFIED HOLD REQUEST signal generator circuit 20 will permit the output pulses of the cycle steal mode signal generator circuit 23 to pass therethrough as the MODIFIED HOLD REQUEST signal. As CPU 12 delivers the corresponding HOLD ACKNOWLEDGE signal to the DMA controller circuit 14, the read/write control circuit 22 included therein will restart data transmission in the Cycle Steal mode as at (F) in FIG. 3. The CPU 12 will be periodically coupled to and uncoupled from the bus system 15 during the progress of such Cycle Steal mode data transmission after the moment t5, just as from moment t1 to moment t4.

After the DATA TRANSMISSION REQUEST signal goes low at a moment t6, as at (A) in FIG. 3, DMA data transmission between memory 13 and I/O device 17 is not required. The DMA controller circuit 14 will hold the CPU 12 unisolated from the bus system 15 in response to the low DATA TRANSMISSION REQUEST signal.

Possibly, the DATA TRANSMISSION REQUEST signal may go high when the CPU 12 is not isolated from the bus system 15 but is inactive, as manifested by the high state of the HALT signal put out by the CPU. In that case the DMA controller circuit 14 will respond to the high DATA TRANSMISSION REQUEST signal by initiating data transmission in the Sustained DMA mode, just as in the t4–t5 interval in FIG. 3.

We believe we have made it clear from the foregoing how data is transmitted between microcomputer memory 13 and I/O device 17 in the Sustained DMA mode, rather than in the Cycle Steal mode, when the CPU 12 is inactive or standing by. Such dual mode method realizes data transmission at a much higher rate than the conventional method employing the Cycle Steal mode only. In the showing of FIG. 3 the Sustained DMA mode is employed in accordance with our invention from moment t4 to moment t5. Heretofore, data has been transmitted in the Cycle Steal mode during this time interval, too, with the DMA transmission and programmed CPU transmission alternated periodically. Therefore, as far as this time interval is concerned, the rate of data transmission in accordance with our invention is approximately twice as high as that according to the prior art.

Additional advantages of our invention are:

1. The switching loss arising from the repeated coupling and uncoupling of the CPU 12 to and from the bus system 15 is eliminted during the t4–t5 interval since then the CPU is held isolated from the bus system.

2. Despite the introduction of the Sustained DMA mode operation, the CPU 12 can respond immediately to the INTERRUPT REQUEST signal for the recommencement of operation in the Cycle Steal mode.

3. System response is superior in both DMA and programmed CPU transmissions to that of the prior art employing burst mode transmission.

4. The invention requires but one bus system, making possible the provision of smaller size, less expensive microcomputers than those employing the conventional dual bus mode.

POSSIBLE MODIFICATIONS

Although we have shown and described our invention in terms of but one preferable embodiment thereof, we recognize that the invention could be embodied in other forms within the broad teaching hereof. Thus the exact details of the above disclosed embodiment are not to impose limitations on our invention since a variety of modifications or alterations are possible in such details. For example:

1. The microcomputer 10 might not be of one chip construction but could be composed of separate parts, possibly with the CPU "Z80" of Zilog, Inc., employed as the central processor unit.

2. The memory 13 could be constituted of a RAM only, instead of comprising a ROM section and a RAM section as in the illustrated embodiment.

3. The INTERRUPT REQUEST signal could be applied to the CPU 12 from some external device other than the I/O device 17.

4. The beginning and end of each Sustained DMA transmission period could be determined by signals delivered to the DMA controller circuit 14 from some external source. A flip flop or equivalent device might then be incorporated in the DMA controller circuit 14 to produce a signal representative of the Sustained DMA transmission period.

What we claim is:

1. A microcomputer system comprising:
   (a) an input/output device having a first line for outputting an interrupt request signal and a second line for outputting a data transmission request signal indicative of whether or not data transmission in a DMA mode is requested;
   (b) interface means;
   (c) a bus system connected to the input/output device via the interface means;
   (d) a memory connected to the bus system for data transmission to or from the input/output device;
   (e) a CPU capable of being electrically coupled to the bus system for data transmission between the input/output device and the memory in a programmed CPU mode, and of being uncoupled from the bus system for data transmission therebetween in the DMA mode, so that data transmission is possible in a cycle steal mode, in which the DMA transmission and the programmed CPU transmission alternate, by periodically coupling the uncoupling the CPU to and from the bus system, the CPU comprising:
      (1) a first terminal for inputting a modified hold request signal which commands the coupling and uncoupling of the CPU to and from the bus system;
      (2) a second terminal for outputting a hold acknowledge signal indicative of whether the CPU is coupled to or uncoupled from the bus system;
      (3) a third terminal for outputting a halt signal indicative of whether the CPU is active or inactive, the halt signal having a first state indicative of which the CPU is active and a second state indicative of which the CPU is inactive; and
      (4) A fourth terminal connected to the first line of the input/output device for inputting the interrupt request signal which commands the CPU to become active; and
   (f) a DMA controller connected to the bus system and to the CPU for controlling data transmission between the input/output device and the memory, the DMA controller comprising:
      (1) a first terminal connected to the second line of the input/output device for receiving therefrom a data transmission request signal;
      (2) a second terminal connected to the third terminal of the CPU for inputting the halt signal; and
      (3) a third terminal connected to the second terminal of the CPU for inputting the hold acknowledge signal;
      (4) a fourth terminal connected to the first terminal of the CPU for outputting the modified hold request signal; and
      (5) a modified hold request signal generator circuit connected between the first and second terminals and fourth terminal of the DMA controller for generating and delivering the modified hold request signal to the CPU in order to cause the same to be controllably coupled to and uncoupled from the bus system, the modified hold request signal generator circuit being responsive to both the data transmission request signal and the halt signal for causing the CPU to be periodically coupled to and uncoupled from the bus system for data transmission in the cycle steal mode if the CPU is active, and as long as the CPU remains so, when DMA data transmission is requested by the data transmission request signal, and for causing the CPU to remain uncoupled from the bus system for data transmission in a sustained DMA mode if the CPU is inactive, and as long as the CPU remains so, when DMA data transmission is requested by the data transmission request signal.

2. The microcomputer of claim 1 wherein the modified hold request signal generator circuit of the DMA controller comprises:

(a) a cycle steal mode signal generator circuit connected to the first input of the DMA controller for generating, when DMA data transmission is requested by the data transmission request signal, a cycle steal mode signal which, when applied to the CPU as the modified hold request signal, periodically couples and uncouples the CPU to and from the bus system for data transmission in the cycle steal mode; and (b) a gate circuit having an input connected to the second input of the DMA controller for receiving the halt signal therefrom, another input connected to the cycle steal mode signal generator circuit for receiving the cycle steal mode signal therefrom, and an output connected to the CPU for delivering the modified hold request signal thereto, the gate circuit permitting the passage therethrough of the cycle steal mode signal when the CPU is active, and of the halt signal when the CPU is inactive.

* * * * *

UNITED STATES PATENT AND TRADEMARK OFFICE
CERTIFICATE OF CORRECTION

PATENT NO. : 4,975,832

DATED : Dec. 4, 1990

INVENTOR(S) : Shuichi Saito et al.

It is certified that error appears in the above-identified patent and that said Letters Patent is hereby corrected as shown below:

Column 8, line 25  change "the" first occurrence to -- and --.

Signed and Sealed this

Fifteenth Day of March, 1994

Attest:

BRUCE LEHMAN

Attesting Officer

Commissioner of Patents and Trademarks